(12) United States Patent
Mears et al.

(10) Patent No.: US 7,429,979 B2
(45) Date of Patent: Sep. 30, 2008

(54) REMOTE CONTROL WITH PROGRAMMABLE BUTTON LABELING AND LABELING DISPLAY UPON BUTTON ACTUATION

(75) Inventors: Mark Gilmore Mears, Zionsville, IN (US); Gregg Michael Morgan, Carmel, IN (US)

(73) Assignee: Thomson Licensing, Boulogne-Billancourt (FR)

(*) Notice: Subject to any disclaimer, the term of this patent is extended or adjusted under 35 U.S.C. 154(b) by 403 days.

(21) Appl. No.: 10/687,042

(22) Filed: Oct. 16, 2003

(65) Prior Publication Data

US 2004/0113892 A1   Jun. 17, 2004

Related U.S. Application Data

(60) Provisional application No. 60/418,809, filed on Oct. 16, 2002.

(51) Int. Cl.
*G09G 5/00* (2006.01)
(52) U.S. Cl. .......................... 345/172; 345/169; 341/23
(58) Field of Classification Search ......... 345/156–179; 348/734; 341/22, 23
See application file for complete search history.

(56) References Cited

U.S. PATENT DOCUMENTS

| | | | | |
|---|---|---|---|---|
| 4,712,105 A | * | 12/1987 | Kohler | .................. 340/825.69 |
| 4,857,898 A | * | 8/1989 | Smith | ........................... 341/22 |
| 5,342,047 A | * | 8/1994 | Heidel et al. | |
| 5,410,326 A | * | 4/1995 | Goldstein | .................... 348/734 |
| 5,450,079 A | * | 9/1995 | Dunaway | ....................... 341/23 |
| 6,496,122 B2 | * | 12/2002 | Sampsell | ............... 340/825.69 |
| 2003/0067451 A1 | * | 4/2003 | Tagg et al. | ................... 345/174 |

* cited by examiner

*Primary Examiner*—Regina Liang
(74) *Attorney, Agent, or Firm*—Joseph J. Laks; Robert D. Shedd; Brian J. Cromarty

(57) ABSTRACT

A universal remote control includes a display that is partitioned into a button touch-screen portion and a message area. The button touch-screen portion includes pre-determined or etched areas defining a plurality of buttons and a given number of pre-determined labels for each button. The message area includes individual pixels (i.e. a dot matrix) that allow the display of messages, labels or the like such as text. Activation of a touch-screen button having a message or label associated therewith causes the message or label to be displayed in the message area of the display. The remote control is customizable by the user. The user can configure a label for a particular button to suit the user's preference(s). This is especially useful for "learning remotes" where the function "learned" (stored) with respect to a particular button or key may bear no relationship to the label printed or available for that button. Now the user can create a custom label that is displayed in a message area of the remote.

17 Claims, 12 Drawing Sheets

United States Patent US 7,429,979 B2

REMOTE CONTROL WITH PROGRAMMABLE BUTTON LABELING AND LABELING DISPLAY UPON BUTTON ACTUATION

This U.S. non-provisional patent application claims the benefit of and/or priority to U.S. provisional patent application Ser. No. 60/418,809 filed on Oct. 16, 2002 entitled Display of Button's Function Upon Actuation.

BACKGROUND

1. Field of the Invention

The present invention relates to remote controls for controlling electronic equipment and, more particularly, to a remote control for controlling electronic equipment wherein a label is provided on a display of the remote control in response to actuation of a button or key of the remote control.

2. Background Information

In a universal remote control (remote), a common problem is that the label printed on a button or key of the remote does not necessarily exactly match the function performed by the button. For example, in RCA's OEM (original equipment manufacturer) universal remotes, the ANTENNA button in a TV (television) mode switches antennas (which is intuitive enough), but in a VCR (video cassette recorder) mode the ANTENNA button performs the function that is more commonly known as TV/VCR. In a SAT (satellite) mode, the ANTENNA button performs the function that is more commonly known as TV/SAT. These three functions share in common the ability to switch the RF (radio frequency) passthrough signal on a device. However, to put the labels ANTENNA, TV/VCR and TV/SAT on a remote would be cluttered, as well as cumbersome with respect to the labeling of a single button. A prior art compromise to the above labeling problem is to label the button with a single label (e.g. ANTENNA) and hope that the user reads the instruction book to discover the other non-self-evident (but related) functions for the button.

Some Universal remotes solve the above-noted problem of the mismatch between button labels printed on the remote and the stored function thereof (pre-programmed or learned) by providing a sheet of stick-on function labels that are pasted onto the remote next to the particular button. Other remotes utilize a list in the user's manual thereto of what functions are stored with regard to which key, presumably for reference and/or memorization by the user.

High-end remotes solve the above-noted problem by utilizing a pixel driven LCD touch-screen display. This type of display has a plurality of small pixels that allow a user to create customized labels for buttons. This type of display also allows button layout and size change via software. In such systems, however, the screen typically displays the button labels and/or configuration without the buttons being activated. While this last solution is very flexible, it is also very costly to implement.

It is evident from the above that what is needed is a remote control that provides a cost effective manner of providing custom key labeling or naming.

SUMMARY

A remote control provides customizable buttons or key names or labels within a dot matrix area of an otherwise pre-etched touch screen button and label area of a display.

In one form, there is provided a remote control having a housing, a controller supported by the housing, a display supported by the housing and coupled to the controller, and memory coupled to the controller and containing program instructions for operation of the remote. The display is divided into a pre-etched touch screen area defining a plurality of touch selectable buttons, and a message area operative to display alphanumeric characters. The program instructions allow a user to define a custom label or name for a selected one of the plurality of selectable buttons that is displayed in the message area when the selected one of the plurality of selectable buttons is actuated.

BRIEF DESCRIPTION OF THE DRAWINGS

In the drawings.

Corresponding reference characters tend to indicate corresponding parts throughout the several views.

DESCRIPTION OF THE PREFERRED EMBODIMENT(S)

Figure 1:
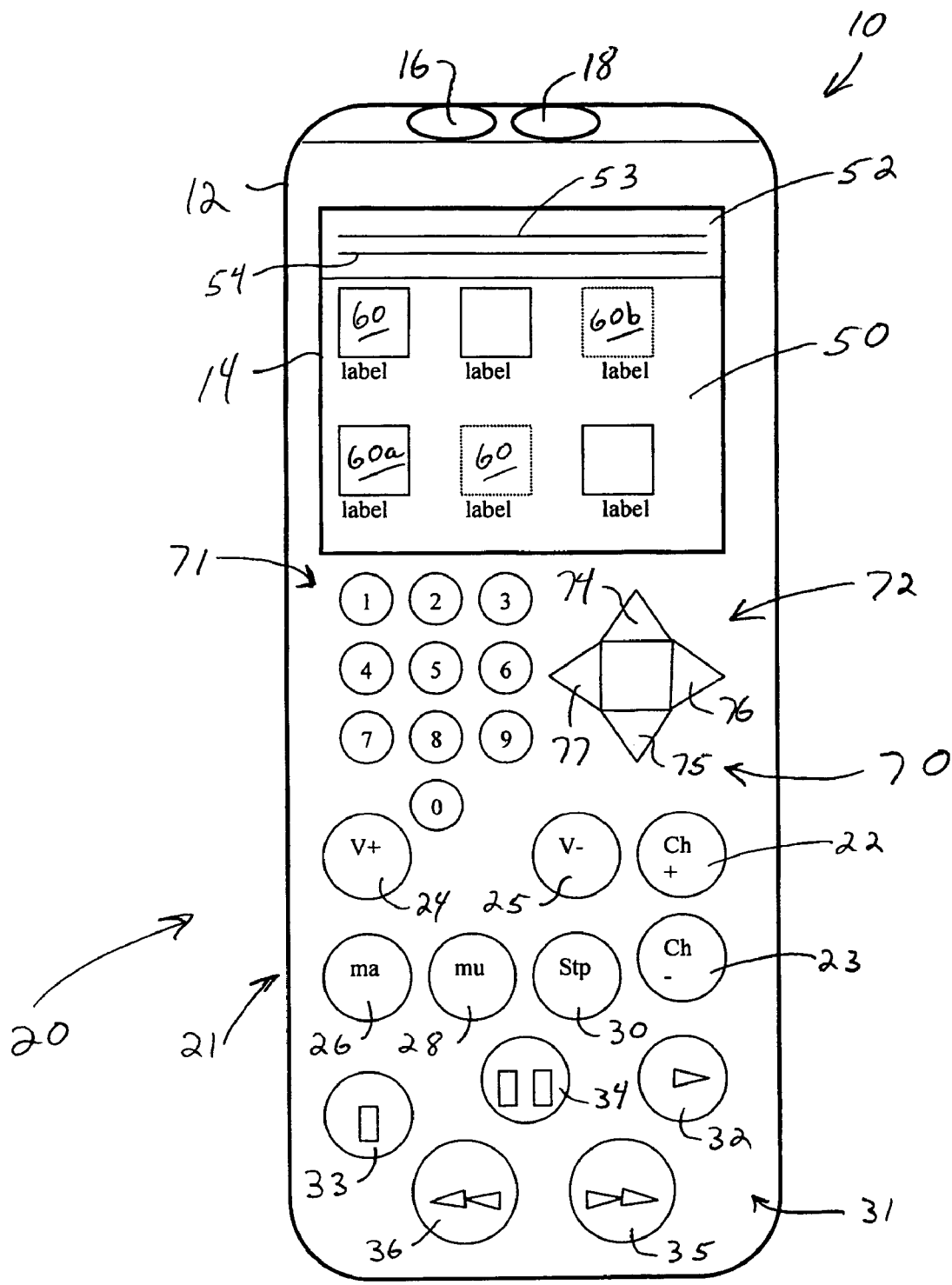
FIG. 1 is a top plan view of a remote control incorporating the principles of the present invention.

Referring now to FIG. 1, there is depicted a remote control (remote), generally designated 10, incorporating an embodiment of the present invention. The remote 10 is utilized to control a piece of electronic equipment (not shown) such as a satellite receiver, set top box (e.g. cable box), VCR, DVD, TV, audio receiver and/or the like, and preferably multiple pieces of electronic equipment or components. As such, the remote 10 is what is known as a universal remote. The remote 10 may, but may not, be capable of learning codes from other remotes in order to allow the remote 10 to function in the manner of other remotes. As well, the remote 10 may, but may not, be capable of executing macros (strings of commands) that the user may program into the remote 10.

The remote 10 includes a case or cover 12. The shape and/or size of the case 12 may be variable. As such, the shape and/or size of the case 12 shown in the figures is only exemplary of a typical style of remote control case 12. Additionally, while the case 12 is preferably fabricated from a suitable plastic, other types of suitable materials may be used to form the case 12. The case 12 houses internal components, described in conjunction with FIG. 2 below, that allow the operation of the remote 10 as described herein. The case 12 also supports a display 14 and a plurality of buttons generally designated 20. The plurality of buttons or keys 20 are typically, but not necessarily, buttons whose functionality is fixed and/or which apply to either all of the types of components that may be controlled by the remote 10 or whose functionality never changes.

The plurality of buttons 20 include a group 21 that consists of general component control buttons. Particularly, the group 21 includes channel up (+) button 22, a channel down (−)

button 23, a volume up (+) button 24, a volume down (−) button 25, a macro (MAC) button 26 and a mute (MU) button 28. The channel up and down buttons 22 and 23 are operative to increment or decrement the channel of the particular component under current control by the remote 10. The volume up and down buttons 24 and 25 are operative to increment or decrement the volume of the particular component under current control by the remote 10. The macro button 26 is operative to initiate a macro, initiate the learning of a macro, select a particular macro when there are more than one macro, and/or perform other functions with respect to macros. The mute button 28 is operative to mute the volume of the component under current control by the remote 10.

While each button of the group 21 described above has a particular functionality, it should be appreciated that each button may initiate additional functionality that is not particularly described herein. This additional functionality may include features that are typical of remote controls for the respective button. As well, each button's function as described above may be implemented in alternative and/or different manners.

The plurality of buttons 20 of the exemplary embodiment 10 of a remote control implementing the present invention also includes a second group 31 that consists of buttons or keys that control the playing of a tape, CD, DVD or the like. The group 31 includes a play button 32, a stop button 33, a pause button 34, a forward button 35 and a reverse button 36. The play button 32 is operative to begin playing of the tape, CD, DVD or the like. The stop button 33 is operative to stop playing of the tape, CD, DVD or the like. The pause button 34 is operative to pause (temporarily stop at a particular location) playing of the tape, CD, DVD or the like. The forward and reverse buttons 35 and 36 are operative to respectively forward and reverse playing of the tape, CD, DVD or the like.

Again, while each button of the group 31 described above has a particular functionality, it should be appreciated that each button may initiate additional functionality that is not particularly described herein. This additional functionality may include features that are typical of remote controls for the respective button. As well, each button's function as described above may be implemented in alternative and/or different manners.

The remote 10 may further include another group or grouping 70 of hard buttons that include a typical keypad 71 and a navigator portion 72. The keypad 71 includes the number 0-9. The number keys 0-9 of the keypad 71 may also correspond to particular letters of the alphabet. This may be accomplished in the typical telephone keypad fashion. The navigator portion 72 includes an up arrow 74 and a down arrow 75. The navigator portion 72 also includes a right arrow 76 and a left arrow 77. The navigation buttons allow navigation through various routines of the remote. As well, the navigation buttons may be used for user input and/or choice selection(s).

Moreover, it should be appreciated that the number, type and/or placement of buttons of the plurality of hard buttons 20 is variable. As such, the number, type and/or placement of the plurality of hard buttons 20 shown in FIG. 1 is only exemplary. It should be additionally appreciated that the remote 10 is only one embodiment of remote control that implements and/or embodies the principles of the subject invention. As such, the remote 10 is representative of other forms of remotes. For example, an alternative form of a remote includes only "hard" buttons and a message area comprising one or more dot matrix lines. Other variations of the features described herein are contemplated and disclosed.

The remote 10 includes a transmitter or transmitter system (collectively, hereinafter, "transmitter") represented in FIG. 1 by a transmitter component 16 (e.g. an LED). The remote 10 also includes a receiver or receiver system (collectively hereinafter, "receiver") represented in FIG. 1 by a receiver component 18 (e.g. an LED). The transmitter 16 is operative to emit, transmit or send a signal or signals representing and/or incorporating information and/or data to an electronic component (not shown). The receiver 18 is operative to receive or acquire a signal or signals such as from another remote control that represent and/or incorporate information and/or data. The receiver 18 is typically utilized to learn the codes of another remote control such that the remote control 10 may learn, use and thus emulate the other remote control 10.

The transmitter 16 is preferably, but not necessarily, an infrared (IR) transmitter of the type such as is known in the art. The transmitter 16 may instead, however, be a radio frequency (RF) type transmitter or other type of transmitter. Likewise, while the receiver 18 is preferably, but not necessarily, an IR receiver, the receiver 18 may be an RF receiver or the like that is capable of receiving emitted or transmitted signals from another remote control (not shown).

In accordance with an aspect of the subject invention, the remote 10 has and the case 12 supports a display 14 that is preferably, but not necessarily, an LCD (liquid crystal display) type display. Of course, other types of displays may be used that are compatible with the principles of the subject invention. The display 14 incorporates or includes an integral touch-screen such as is known in the art. The display 14 is divided into two areas, a button area 50 and a message area 52. The whole display 14 (including both areas) may include the touch screen. Alternatively, only the button area 50 may include the touch screen.

The button area 50 is capable of displaying up to a certain number of buttons, each one of which is generally designated 60. The number of buttons 60 is variable and dependent upon the size of the button area 50 and the size of each button 60. The buttons 60 may all be the same size and/or shape, or they may be different in size and/or shape. Typically, each button 60 is square and of the same size. It should be appreciated that the number of buttons for a remote will generally be greater than the number shown in FIG. 1. The remote may support any number of buttons depending on button and screen size. (In one form, the button area 52 supports up to 40 displayable buttons 60). The touch screen portion of the button area 52 preferably only works over the buttons 60 and not in other areas of the screen.

The buttons 60 are pre-etched on the LCD rather than made up of individual pixels or a dot matrix. Thus, the outline of a button may be etched on the LCD. This reduces the cost of the button area 50. As such, each button 60 may be individually turned on and off. A particular mode of operation (e.g. TV, VCR, DVD) may have some of the buttons 60 on while some of the buttons 60 may be off. Button 60a is representative of a button being on, while button 60b is representative of a button being off. In a given mode of the remote 10, one or more buttons may be off (not visible and/or not usable) while one or more buttons may be on. In a default state of the remote 10, some buttons are turned on while others are turned off so they don't appear at all.

A label or, interchangeably and collectively herein, name (represented by the term "label" in FIG. 1) is associated with each button 60. The label or name for a button is on (displayed) when a button is on. Each label is, like the buttons, pre-etched on the LCD rather than made of up individual pixels or a dot matrix. This, in conjunction with the pre-etched buttons, reduces the cost of the button area 50.

Each label, however, may be one of a given number of pre-determined or canned labels. This given number of labels is generally small such as on the order of three (3) or so labels. As an example, there may be three pre-determined labels (USER, GUIDE, FRONT). Only one label is displayed when the button is on depending on the current mode of the remote, while the other labels are off (do not appear on the LCD). The remote 10 may be customized such that any given label may appear for the button 60 in a given mode (e.g. TV, VCR, DVD). Thus, the user can select which predetermined or "canned" label will appear for a given button for a given mode. The predetermined labels, however, cannot be changed. The remote 10 may also be programmed such that certain buttons appear (on) while certain buttons do not appear (off) (i.e. for a given button, no labels or outline appears). The remote 10 may also be programmed such that some buttons appear but with only the outline thereof and no label. Various combinations are possible and contemplated.

The message area 52 is capable of displaying messages such as characters, text and/or the like. As such, the message area 52 has two lines 53 and 54 for display. The message area 52 may have more or less number of lines as appropriate and/or desired. Each line is made of a dot matrix or a plurality of pixels that can be turned on and off to create characters so as to allow the display of messages. The message area 52 is operative to display messages such as "Reset Remote?", "Setup Macros?"), time and date, device mode (e.g. TV, tuner, VCR, CD, DVD) and the like. In accordance with an aspect of the subject invention, the message area 52 is also operative to display a custom label for a button. The custom label is typically a label assigned by the user. The custom label is displayed when the corresponding button is activated. The button may be a hard button 20, but is preferably a touch screen button 60. Thus, rather than displaying the assigned or custom label for a button 60 adjacent the particular button, the assigned or custom label is displayed in the message area 52. The custom label allows the user to assign a label that is more appropriate for the function or the button. This is particularly useful for the learning mode of the remote 10.

The remote 10 may be configured such that the custom label is displayed in the message area 52 as long as the corresponding button is pressed. If the user were to press and release a button without holding it down, the user's custom label may persist in the message area 52 for a given amount of time (e.g. 2-3 seconds). Thereafter, the message area 52 may display the time, date and/or other information.

This feature is especially useful for labeling macro buttons that otherwise would, at best, have cryptic and/or generic labels. For example, the term "Macro 1" may become "Turn It All On" referring to the turning on of all components or items thereof; the term "Macro 2" becomes "Turn It All Off" referring to the turning off of all components or items thereof; the term "Macro 3" becomes "SportGuide Sort" referring to the sorting of Sports shows on the program guide; the term "Macro 4" becomes "Watch a Movie"; the term "Macro 5" becomes "Record a DVD to VCR"; etc.

By displaying the name of the button in the message area, the user can more easily memorize the true function and location of the button. If the user cannot recall which button has which function assigned to it, one workaround is to cover the IR-transmit diode with the hand and press the button to check the label that has been assigned to the button. The user may wish to turn on only the outline of the learned key, and use the message area exclusively to identify the actual key function when it is pressed.

Figure 3:
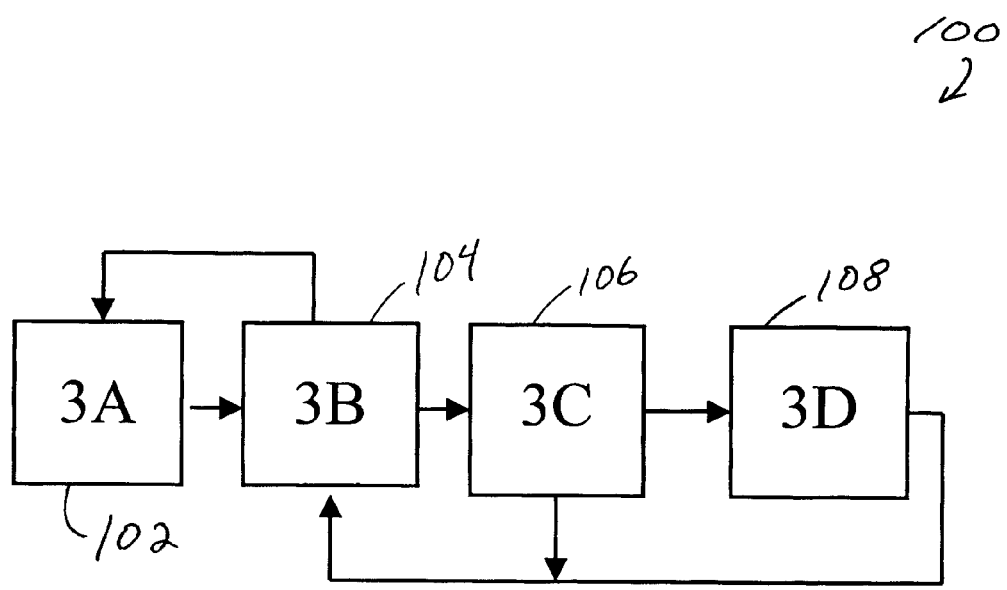
FIG. 3 is a simplified flowchart of an exemplary manner of operation of the remote control of FIG. 1, particularly of a manner of customizing key name from within a learning mode of the remote control.
Figure 4:
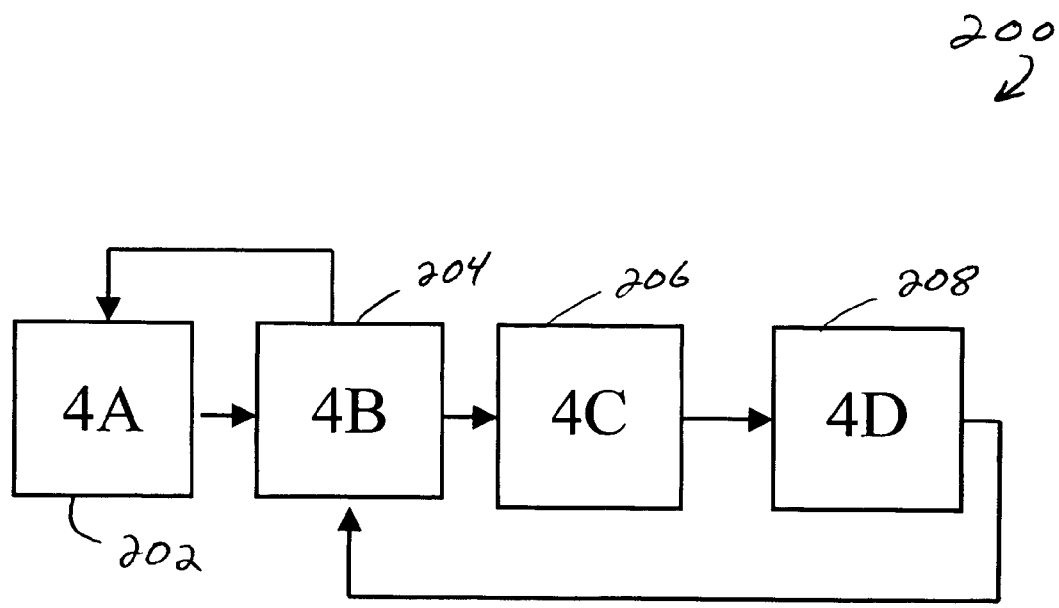
FIG. 4 is a simplified flowchart of another exemplary manner of operation of the remote control of FIG. 1, particularly of a manner of customizing key name using a setup mode of the remote control.

The remote 10 is operative to allow the custom label to be defined by the user in several manners utilizing a key label mode. One manner is to allow a key label mode after an IR learn process or within a learning mode of the remote (e.g. "Do you want to create a custom label for this button?"). This is depicted in the flowchart of FIG. 3 and described in conjunction therewith. Another manner is to allow a key label mode at any time within a setup mode of the remote 10. This is depicted in the flowchart of FIG. 4 and described in conjunction therewith. Alphanumeric and/or other characters are selected via predetermined button or key actuation.

The remote 10 may allow user input (selection) of each alphanumeric character to be displayed in each dot matrix position via up/down (arrow) keys or other key (hard button or touch screen button) combination. User input (selection) of the position of the character in the line (e.g. previous/next) may be accomplished via left/right (arrow) keys or other key (hard button or touch screen button) combination.

Figure 2:
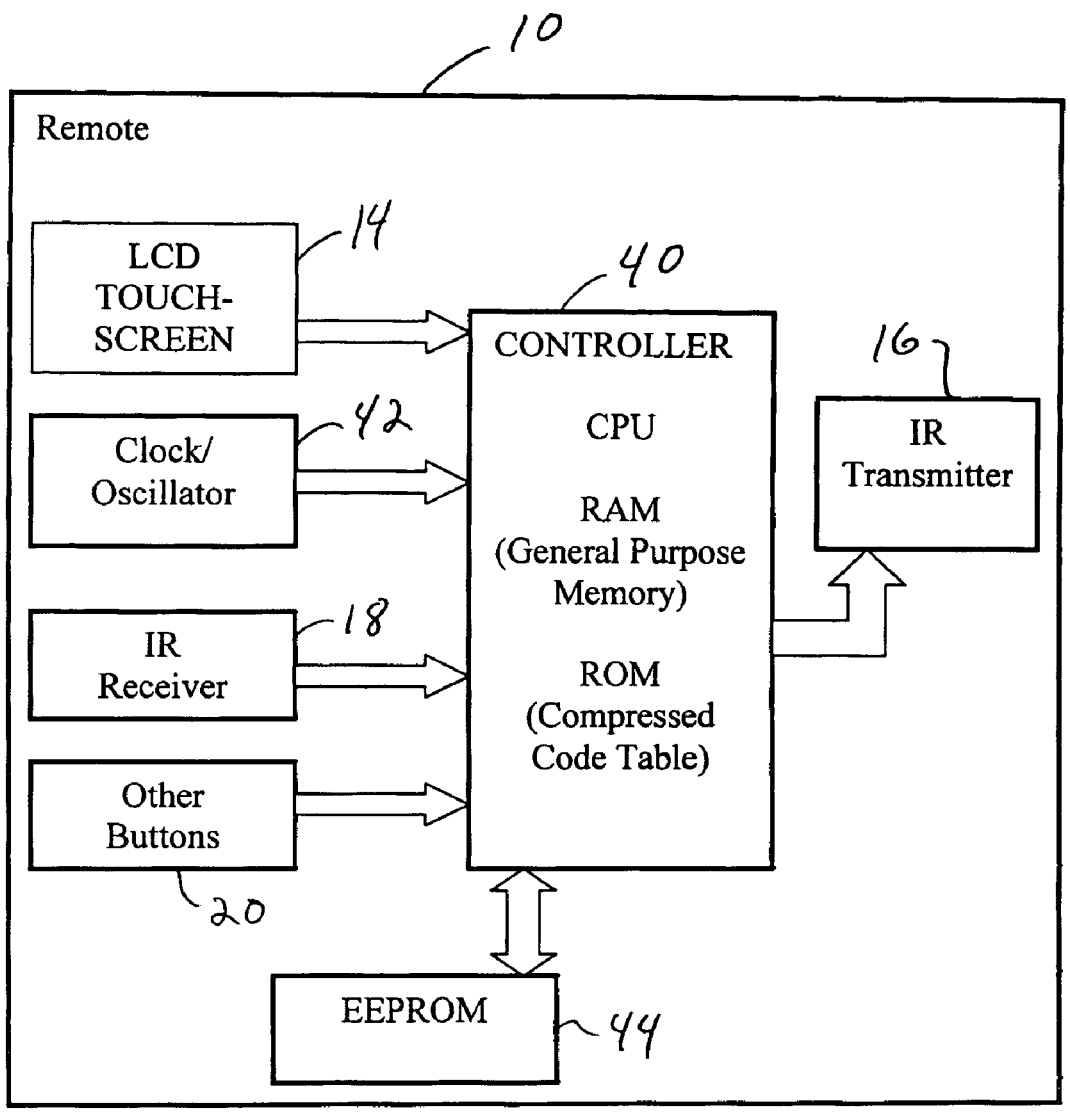
FIG. 2 is a simplified block diagram of the components of the remote control of FIG. 1.

Referring to FIG. 2, a block diagram of at least some of the components of the remote control 10 is depicted. These components allow the functioning of the remote control 10 as described herein. Particularly, the remote control 10 includes a controller, central processing unit (CPU), processing unit, processing means or the like 40. The controller 40 provides the main processing of the data/signals from the other components of the remote 10, as well as provide control and/or instructions to the other components of the remote control 10 for their proper functioning. The controller 40 includes memory such as RAM (random access memory) for temporarily storing data/information/program instructions. In one form, the RAM is general purpose memory. The controller 40 includes memory such as ROM (read only memory) for permanently storing data/information/program instructions. In one form, compressed code tables for operation of the remote control 10 may be stored in the ROM. The remote control 10 includes program instructions that are stored in memory. The program instructions allow the remote control 10 to function and/or operate in the manner set forth herein.

The remote 10 includes a clock or oscillator 42 that provides clock signals, clocking signals and/or the like to the controller 40 as represented by the arrow emanating from the block 42. The diagram of FIG. 2 also shows the IR receiver (for learning codes/signals of another remote or the like) as a block 18 whose received signals are forwarded to the controller 40 as represented by the arrow. Moreover, the IR transmitter (for emitting control signals to an electronic component) is represented by a box 16. The controller 40 provides appropriate signals to the IR transmitter 16 as represented by the arrow emanating from the controller 40.

The remote 10 also includes EEPROM 44 that is used to store information/data such as macros and the like. The EEPROM 44 and the controller 40 are shown as connected by a double-headed arrow between the EEPROM 44 and the controller 40. This represents an exchange of data between the two.

Also shown in FIG. 2 is the touch screen 14 coupled to the controller 40 for communication therewith. The IR transmitter 16 is coupled to the controller 40 for communication therewith such that the controller 40 provides signals to the IR transmitter 16. The IR receiver 18 is coupled to the controller 40 for communication therewith. As well, the buttons 20 are coupled to the controller 40 for communication therewith.

Program instructions, tables, data and/or the like are stored in ROM and/or EEPROM that provide the functionality described herein. The program instructions are executable by the controller 40.

The present remote control 10 thus includes a screen and/or display that displays or shows the name of a specific function (label) for a button when that button is pressed. The button may be one of the plurality of buttons 20, may be a touch-screen button, or both. In an ideal case, a user can configure a label for a particular button to suit the user's preference(s). This is especially useful for "learning remotes" where the function "learned" (stored) with respect to a particular button or key may bear no relationship to the label printed or available for that button. Now the user can create a custom label that is displayed in a message area of the remote.

Referring now to FIG. 3, a generalized flowchart 100 is depicted of a manner of operation of the remote control 10 in accordance with the principles of the present invention. Particularly, the flowchart 100 illustrates a manner of customizing the name of a key from within a learning mode of the remote control. This allows a user the chance to create or define a custom label for a key that is being learned (within the learning mode). The created custom label is then displayed when the button is pressed, actuated, activated or the like in the manner set forth herein. In the program 100, the creation of a label for a chosen button is part of the learning mode for a button.

Figure 3A:
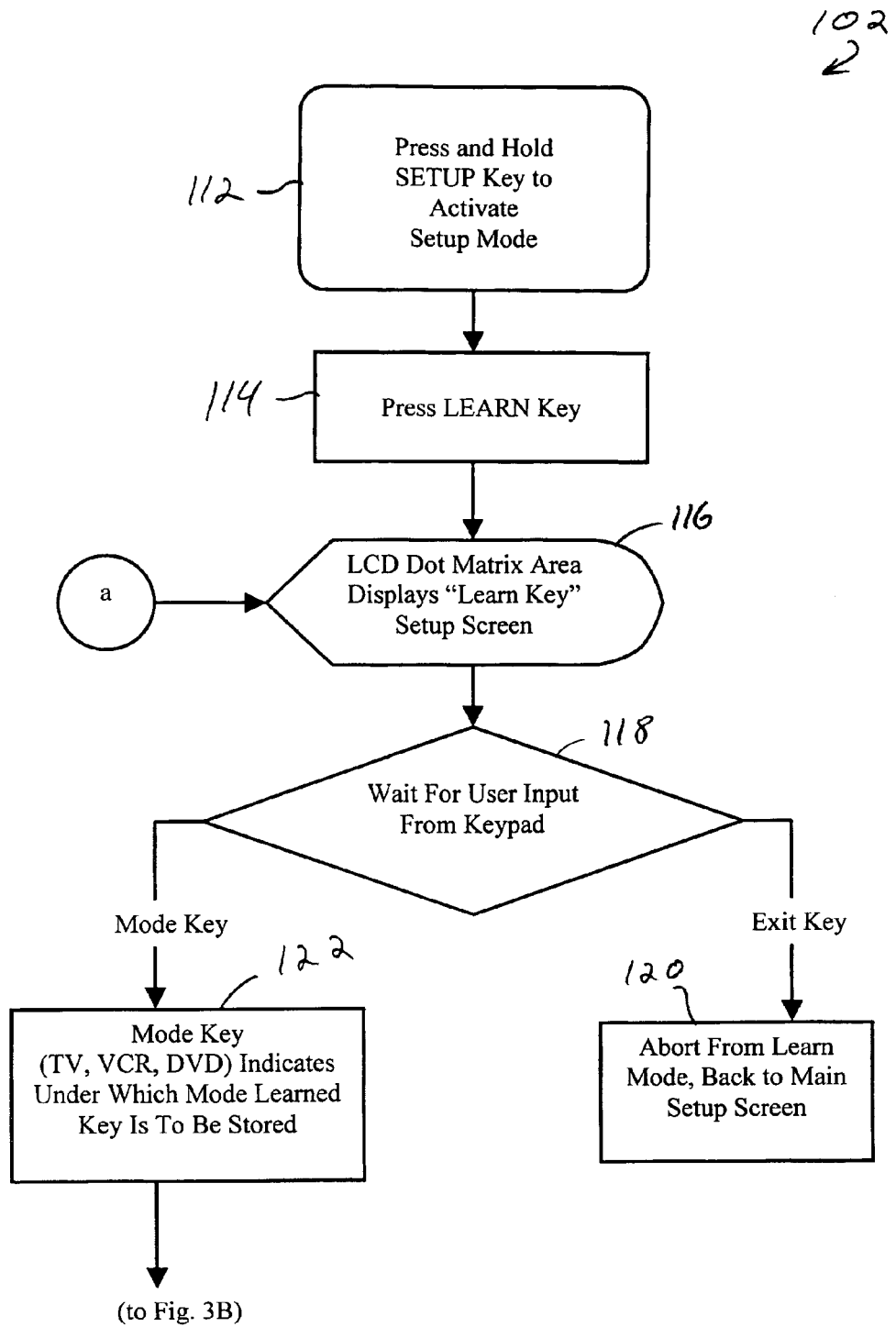
FIGS. 3A-D depict a detailed flowchart of the flowchart of FIG. 3.
Figure 3B:
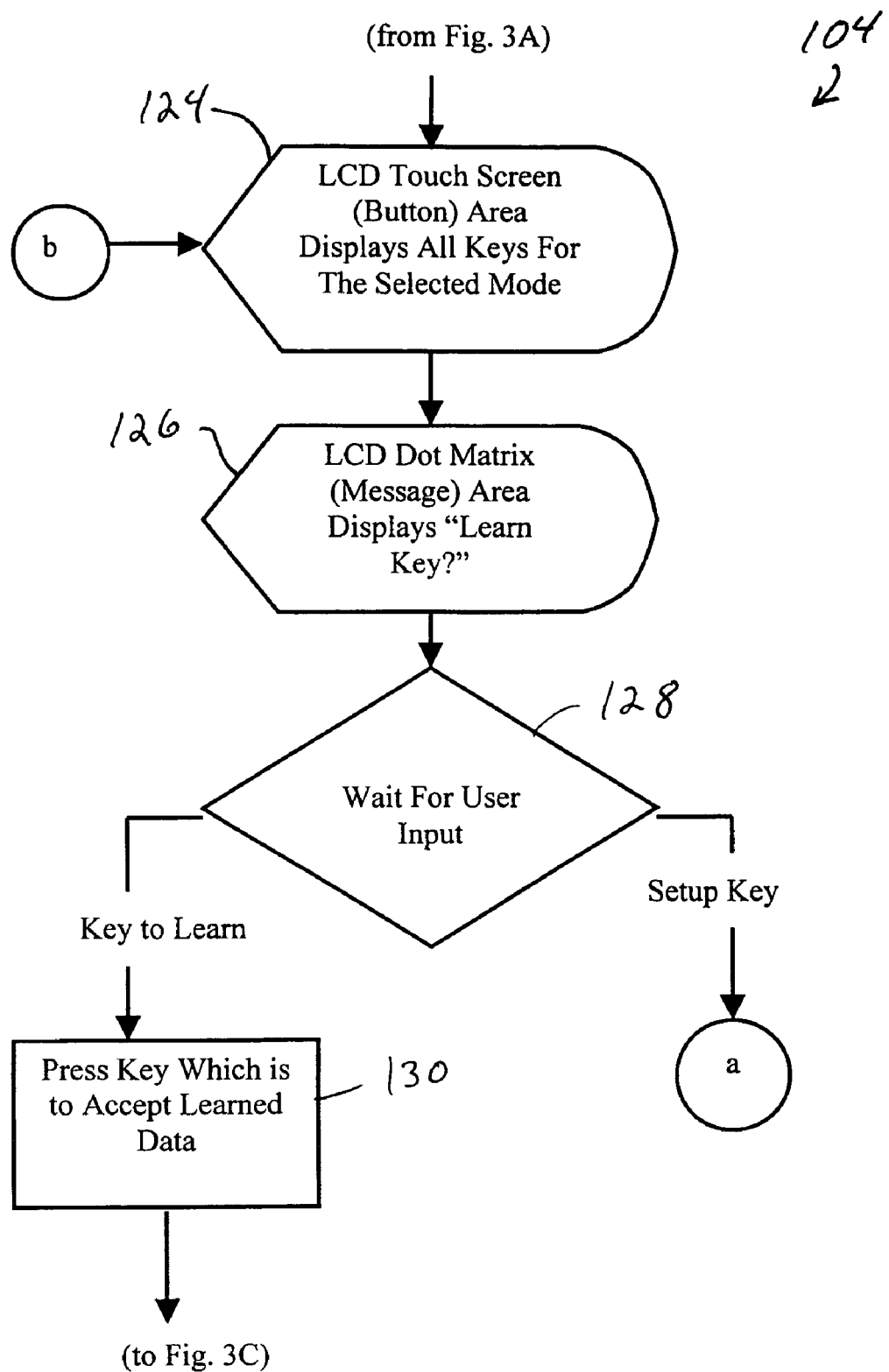
Figure 3C:
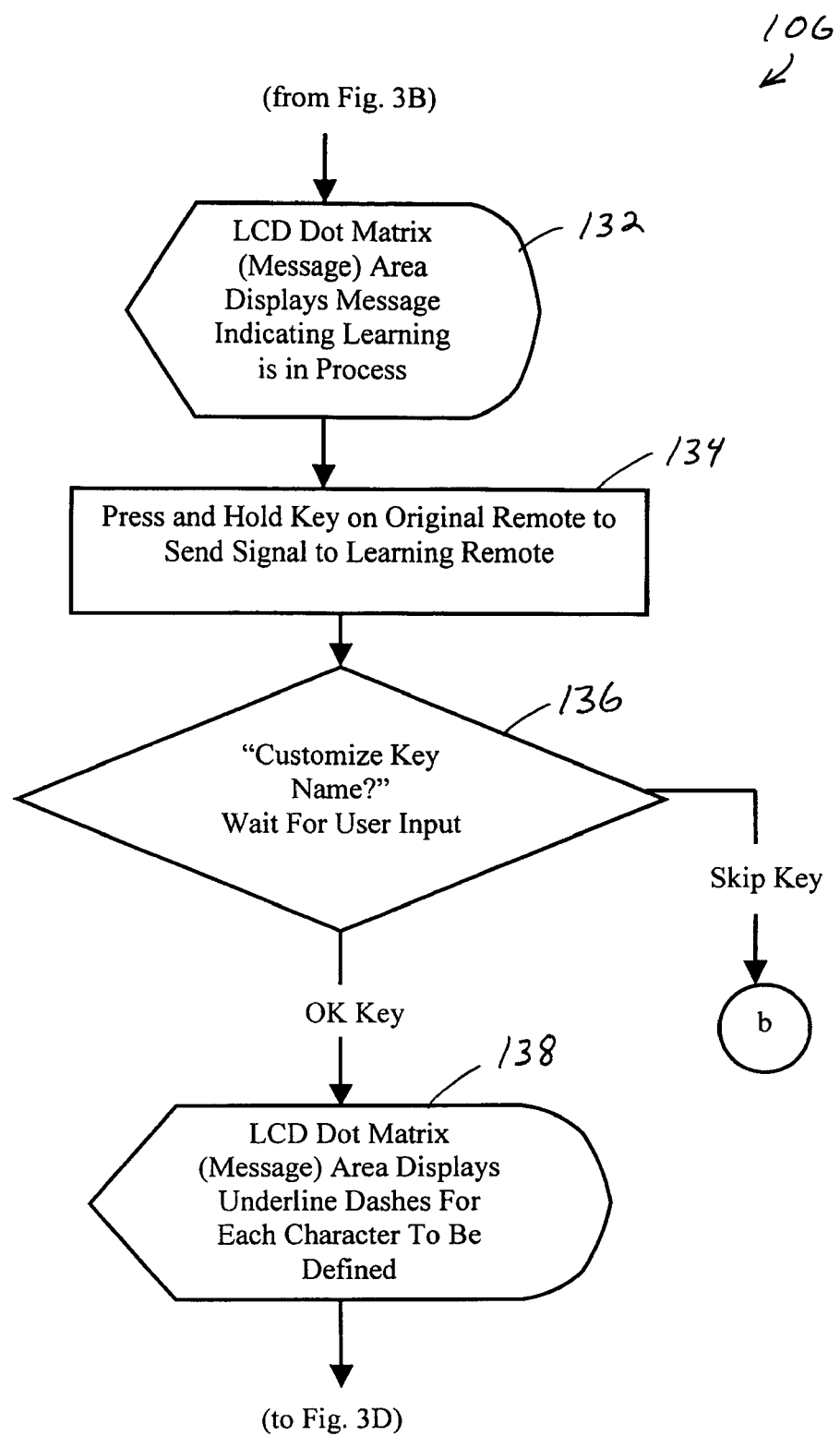
Figure 3D:
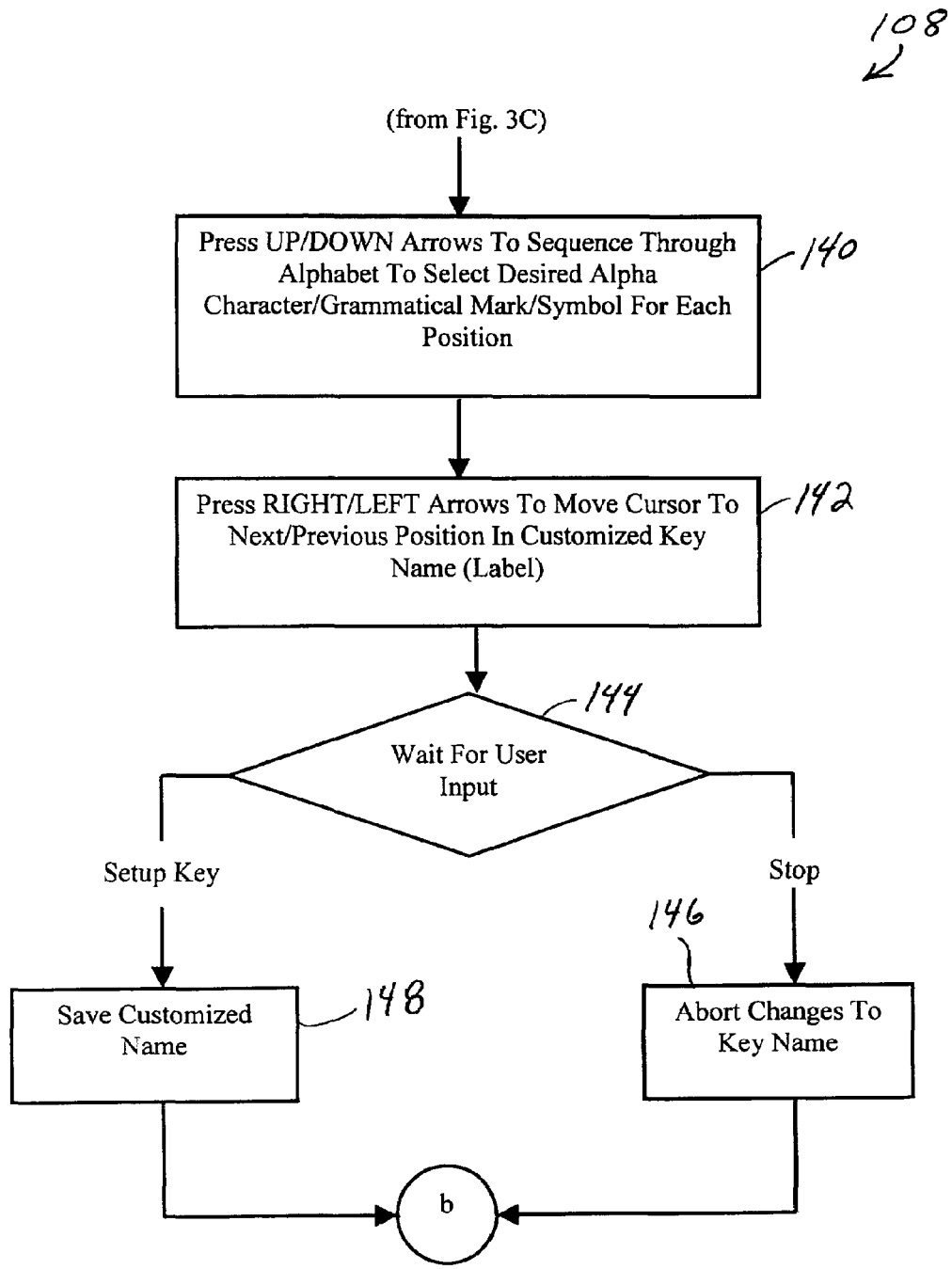

The flowchart 100 is arbitrarily divided into four figures for visual ease only. Particularly, flowchart 100 includes FIGS. 3A, 3B, 3C and 3D. FIG. 3A depicts flowchart portion 102. FIG. 3B depicts flowchart portion 104. FIG. 3C depicts flowchart portion 106. FIG. 3D depicts flowchart portion 108.

Referring to FIG. 3A, the procedure 100 begins with block 112 wherein a user presses (activates) the setup button 30 in order to activate the setup mode (i.e. "program the remote" mode). In block 114, the user then selects the LEARN key from the available setup mode selections. At this point, block 116, the LCD dot matrix area (i.e. message area 52) displays a "Learn Key" message (or other appropriate text) in the setup screen.

The remote 10 then waits for user input from the keypad, block 118. If the user chooses an Exit key, the learning mode routine will abort and go back to the main setup screen, block 120. If the user chooses a particular Mode key, block 122, the user has then selected the particular mode under which the learned key is to be stored. Thereafter, the program flow proceeds to block 124 of FIG. 3B.

In block 124 of FIG. 3B, the LCD touch screen area (button area 50) of the remote 10 displays all keys for the selected mode. At the same time, in block 126, the dot matrix area (message area 52) of the remote 10 displays the message or text "Learn Key?" (or other similar message/text).

In block 128 the remote 10 then waits for input from the user. If the user chooses/selects a setup key, the program will skip to block 116 (represented by "a"). Program flow will then begin again at block 116. If the user chooses/selects an appropriate Key to Learn, the key pressed is the one which will accept the learned data, block 130. Thereafter, the program flow proceeds to block 132 of FIG. 3C.

In block 132 of FIG. 3C, the LCD dot matrix area (message area 52) displays a message indicating that learning is in process. Simultaneous to step 132, in step 134, the user presses and holds a key on the original remote (not shown) to send a signal to the learning remote (remote 10). After the function is successfully learned, in block 136, the remote offers the user the chance to customize that key's label by displaying "Customize Key Name" in the dot matrix/message area 52. The remote then waits for user input.

If the user selects the Skip key, the remote will skip the key-name customization step and then proceed to block 124 (see FIG. 3B). If the user selects the OK key, the routine proceeds to step 138. In block 138, the LCD dot matrix (message) area displays an underline for each character to be defined (i.e. the underline dashes are pre-populated with the default name for that key if one exists. Thereafter, the routine proceeds to block 140 of FIG. 3D.

The name or label is changed from the default name (if any) of the selected key. Thus, in block 140, the up and down arrows (or other key) are used to sequence through the alphabet to accordingly select the desired alpha characters, grammatical marks, symbols and/or the like for each position as desired. In block 142, the user presses right and left arrows accordingly to move the cursor to the next and/or previous position in the customized key name (label) as desired.

During customization of the key name, the remote waits for the user to select the Stop key or the Setup key. If the Stop key is selected, then in block 146 the changes to or the initial entry of the key name are aborted. If the Setup key is selected, then the customized key label is saved, block 148. Thereafter, the routine goes to block 124 of FIG. 3B.

Of course, it should be appreciated that the flowchart described above may have more or less steps in alternative embodiments of the procedure 100. As well, subsets of the above procedure 100 may implement the principles of the subject invention rather than the whole procedure. Variations are also contemplated.

Referring now to FIG. 4, a generalized flowchart 200 is depicted of a manner of operation of the remote control 10 in accordance with the principles of the present invention. Particularly, the flowchart 200 illustrates a manner of customizing the name of a key from within a setup mode of the remote control. This allows a user to create or define a custom label for a key at any time (within the setup mode). The created custom label is then displayed when the button is pressed, actuated, activated or the like in the manner set forth herein.

Figure 4A:
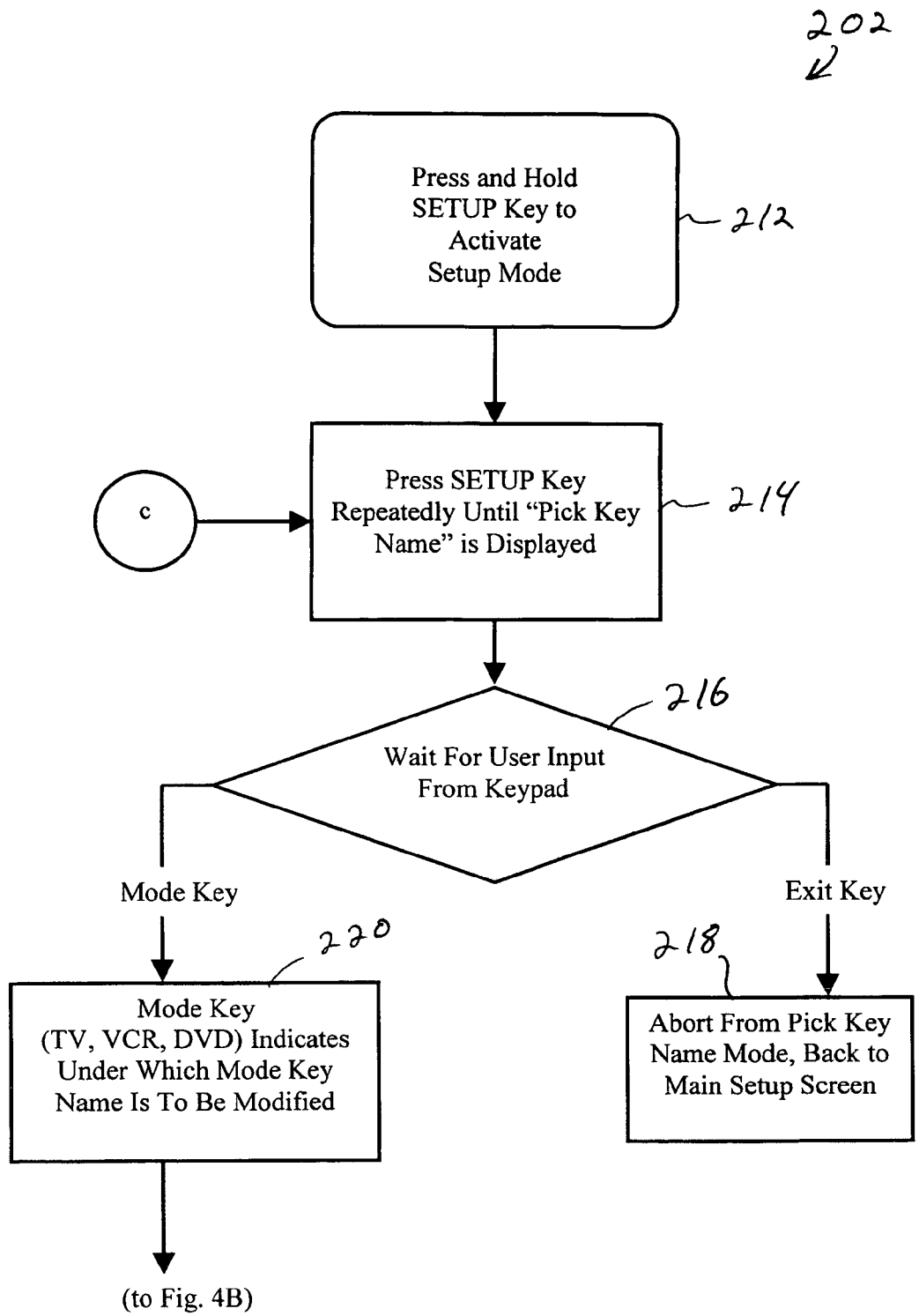
FIGS. 4A-D depict a detailed flowchart of the flowchart of FIG. 4.
Figure 4B:
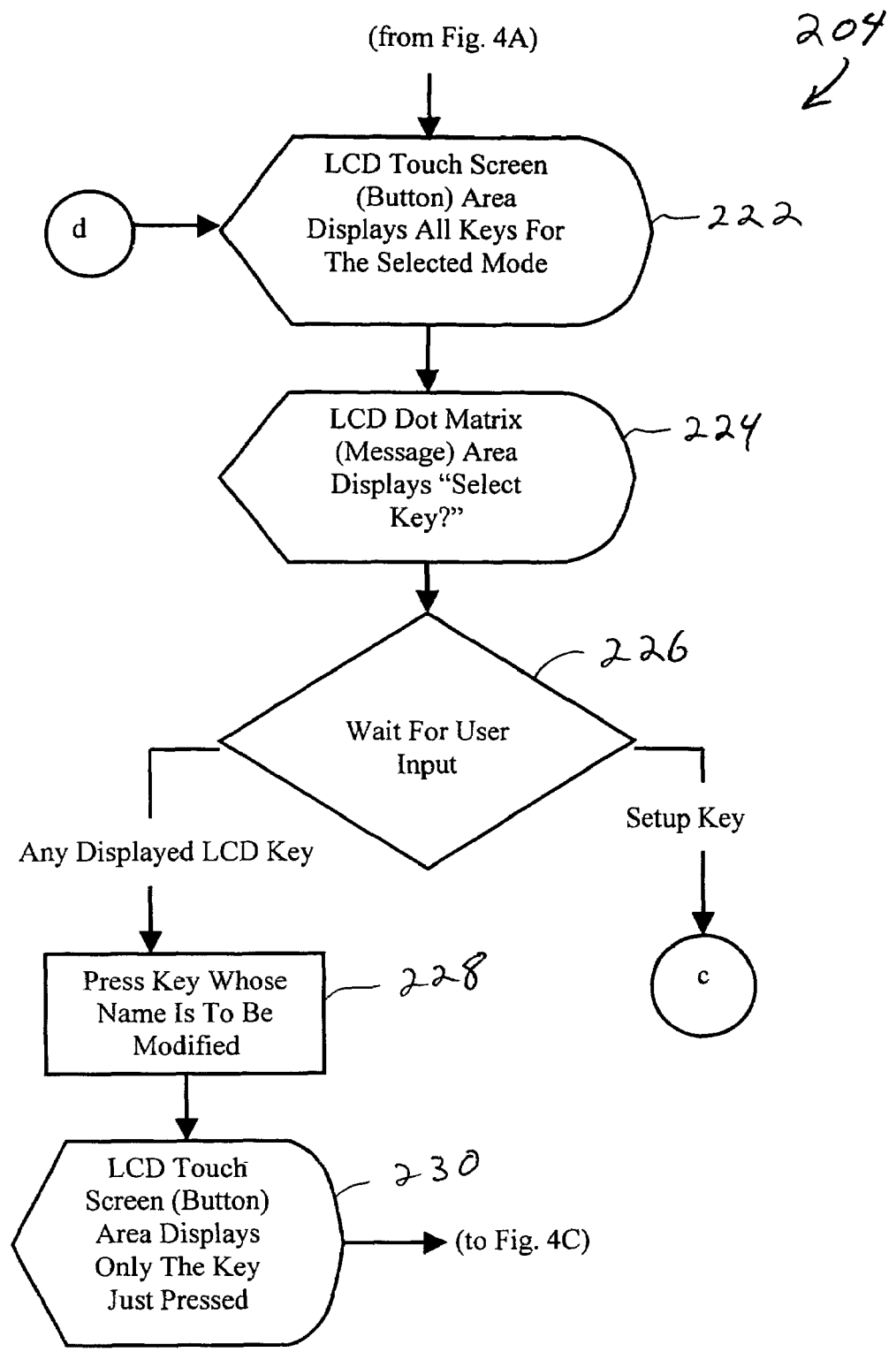
Figure 4C:
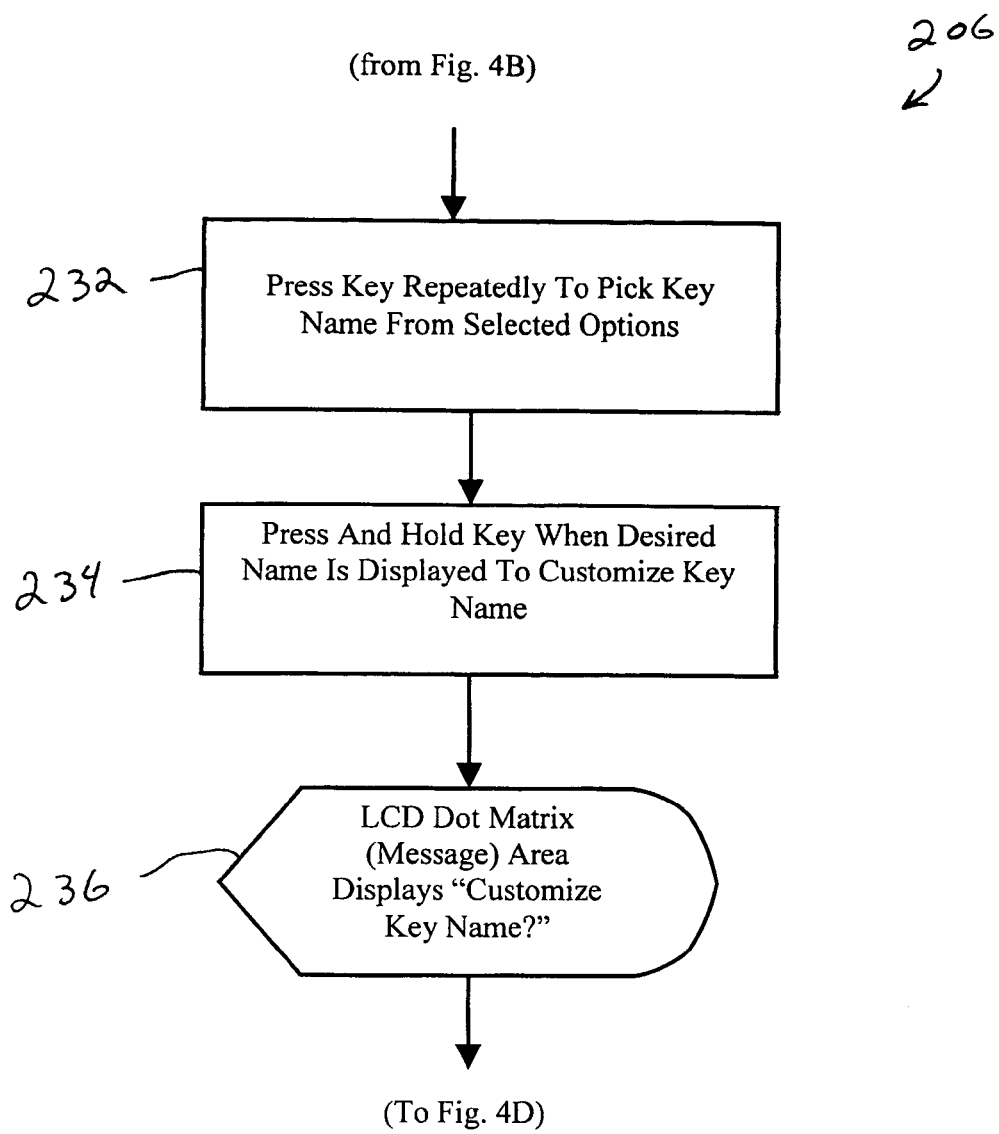
Figure 4D:
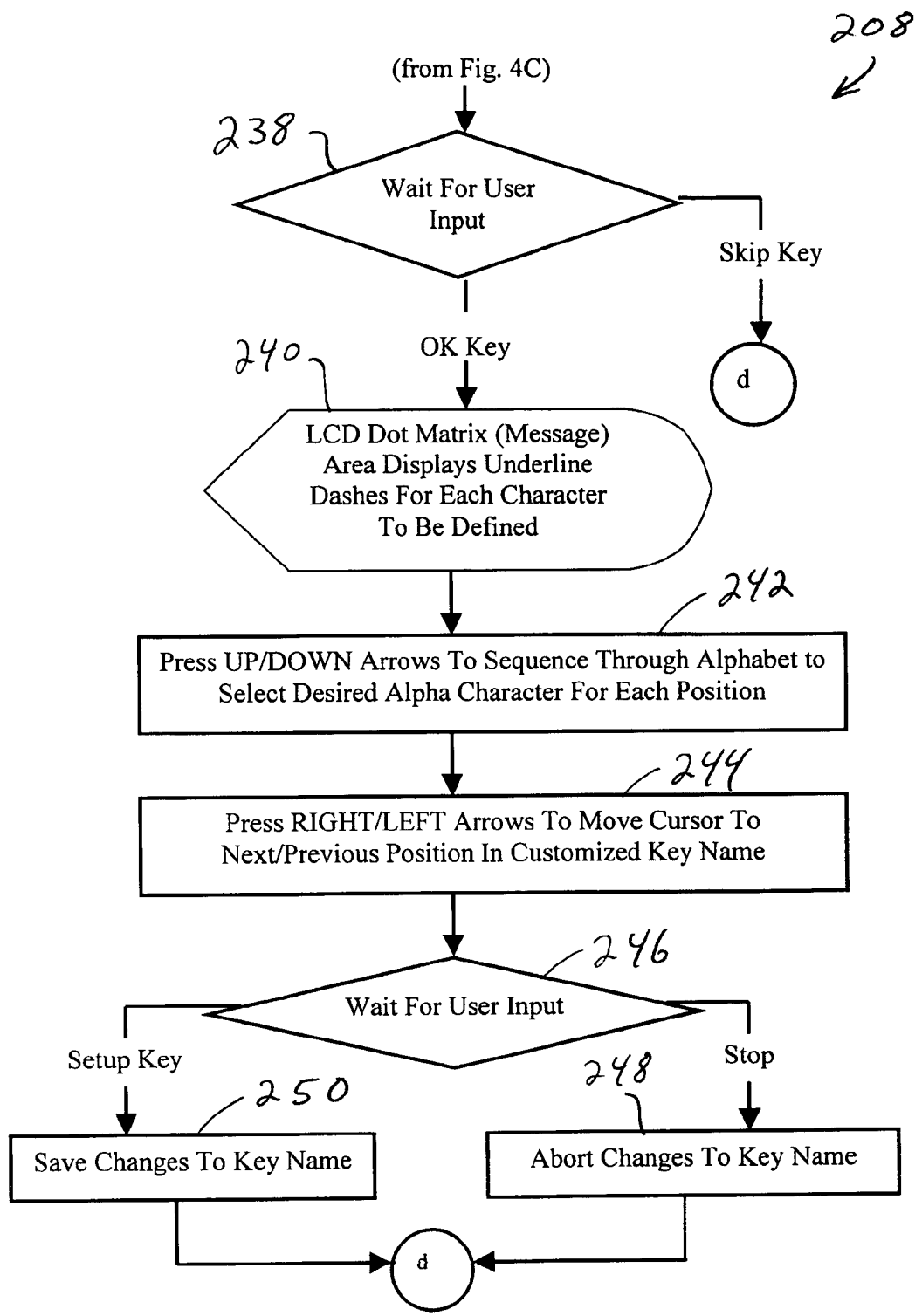

The flowchart 200 is arbitrarily divided into four figures for visual ease only. Particularly, flowchart 200 includes FIGS. 4A, 4B, 4C and 4D. FIG. 4A depicts flowchart portion 202. FIG. 4B depicts flowchart portion 204. FIG. 4C depicts flowchart portion 206. FIG. 4D depicts flowchart portion 208.

Referring to FIG. 4A, the procedure 200 begins with block 212 wherein a user presses and holds (activates) the setup button 30 in order to activate the setup mode (i.e. "program the remote" mode). In block 214, the user then repeatedly presses the SETUP key until the appropriate selection is displayed. In this instance, the user would choose "Pick Key Name" as a displayed selection. The remote 10 then waits for user input such as from a keypad of the remote, block 216.

If the user presses the Exit key, the routine aborts from the "Pick Key Name" mode and then goes back to the Main Setup screen, block 218. If the user chooses a particular Mode key, the user has then indicated under which mode a key name is to be modified, block 220. Thereafter, the routine proceeds to block 222 of FIG. 4B.

Referring to FIG. 4B, in block 222, the LCD touch screen (button) area displays all keys for the selected mode. Additionally, in block 224, the LCD dot matrix (message) area displays "Select Key?" to indicate to the user that a key selection is next. The remote 10 then waits for user input, block 226. If the user selects the Setup key, the routine will proceed to block 214 (see FIG. 4A) to begin at that point. If, however, the user selects Any Displayed LCD Key, the user has effectively pressed or selected the key whose name is to be modified. Particularly, the user can pick a key name from the selected options, e.g. SUBTITLE, CAPTIONS, DISPLAY, <key with border only and no label>, <key with no border and no label>, etc. In block 228, the user then presses a key whose name is to be modified. At this point, the LCD touch screen (button) area displays only the key just pressed, block 230. Routine flow then proceeds to block 232 of FIG. 4C.

In block 232, the user then presses the key repeatedly to pick a key name from the selected options. In block 234, the user presses and holds the key when the desired name is displayed. The LCD dot matrix (message) area then displays "Customize Key Name?" to allow customization, block 236. The remote then waits for user input, block 238 of FIG. 4D. If the user then selects the Skip key, the routine proceeds to block 222 and continues from there. If the user selects the OK key, the LCD dot matrix (message) area displays underline dashes (or other symbol) for each character to be defined. Again, the underline dashes are pre-populated with the default name for that key, if any.

The Up/Down arrows of the remote, or other keys, are used to select the desired alpha (alphanumeric, symbol, etc.) character for each position, block 242. The Right/Left arrows of the remote, or other keys, are used to select the next and/or previous position in the customized key name, block 244. In this manner, the user defines the customized key name. Thereafter, the remote waits for user input, block 246. If the Stop key is selected, the changes to key name are aborted, block 248 and the routine proceeds to block 222. If the Setup key is selected, the changes to the key name are saved, block 250, and the routine proceeds to block 222.

Of course, it should be appreciated that the flowchart described above may have more or less steps in alternative embodiments of the procedure 200. As well, subsets of the above procedure 200 may implement the principles of the subject invention rather than the whole procedure. Variations are also contemplated.

Moreover, it should be appreciated that the message area 52 may be realized by means other than a dot matrix LCD. The message area 52 may comprise LEDs or the like, or any display that allows for the depiction of alphanumerics. Combinations of technology and/or new technology is contemplated.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. A remote control comprising:
   a housing;
   a controller supported by said housing;
   a display supported by said housing and coupled to said controller for communication therewith, said display divided into a pre-etched touch screen area defining a plurality of touch selectable buttons and associated labels, each of said plurality of touch selectable buttons and associated labels being etched within said pre-etched touch screen area, and a programmable message area operative to display user selected alphabetic characters; and
   memory coupled to said controller for communication therewith and containing program instructions that allow a user to define a custom label for a selected one of said plurality of selectable buttons that is displayed in said message area when said selected one of said plurality of selectable buttons is actuated.

2. The remote control of claim 1, wherein said message area is defined by a dot matrix configuration.

3. The remote control of claim 2, wherein said dot matrix configuration defines two rows of message area.

4. The remote control of claim 1, wherein said custom label is defined during a learning mode of the remote.

5. The remote control of claim 1, wherein said custom label is defined during a setup mode of the remote.

6. The remote control of claim 1, wherein said display comprises an LCD.

7. The remote control of claim 1, further comprising:
   a receiver supported by said housing and coupled to said controller for communication therewith, said receiver operative to receive signals from another remote control for learning the received signals; and
   a transmitter supported by said housing and coupled to said controller for communication therewith, said transmitter operative to transmit signals from the universal remote for control of an unconnected electronic component.

8. The remote control of claim 7, wherein said receiver comprises an IR receiver, and said transmitter comprises an IR transmitter.

9. The remote control of claim 1, further comprising a plurality of hard buttons carried by said housing and coupled to said controller for communication therewith, said program instructions further allow the user to define a custom label for a selected one of said plurality of hard buttons that is displayed in said message area when said selected one of said plurality of hard buttons is actuated.

10. A remote control comprising:
    a housing;
    means, supported by said housing, for controlling the remote;
    means, supported by said housing and coupled to said means for controlling, for displaying a pre-etched touch screen area defining a plurality of touch selectable buttons and associated labels each of said plurality of touch selectable buttons and associated labels being etched within said pre-etched touch screen area, and a programmable message area operative to display user selected characters; and
    means, coupled to said controller for communication therewith, for allowing a user to define a custom label for a selected one of said plurality of selectable buttons that is displayed in said message area when said selected one of said plurality of selectable buttons is actuated.

11. The remote control of claim 10, wherein said message area is defined by a dot matrix configuration.

12. The remote control of claim 11, wherein said dot matrix configuration defines two rows of message area.

13. The remote control of claim 10, wherein said custom label is defined during a learning mode of the remote.

14. The remote control of claim 10, wherein said custom label is defined during a setup mode of the remote.

15. The remote control of claim 10, wherein said means for displaying comprises an LCD.

16. The remote control of claim 10, further comprising:
    means, supported by said housing and coupled to said controller for communication therewith, for receiving signals from another remote control for learning the received signals; and
    means, supported by said housing and coupled to said controller for communication therewith, far transmitting signals from the universal remote for control of an unconnected electronic component.

17. The remote control of claim 16, wherein said means for receiving comprises an IR receiver, and said means for transmitting comprises an IR transmitter.

* * * * *